Aug. 1, 1944.   C. H. DAVIS   2,354,985
DRILL
Filed May 22, 1943
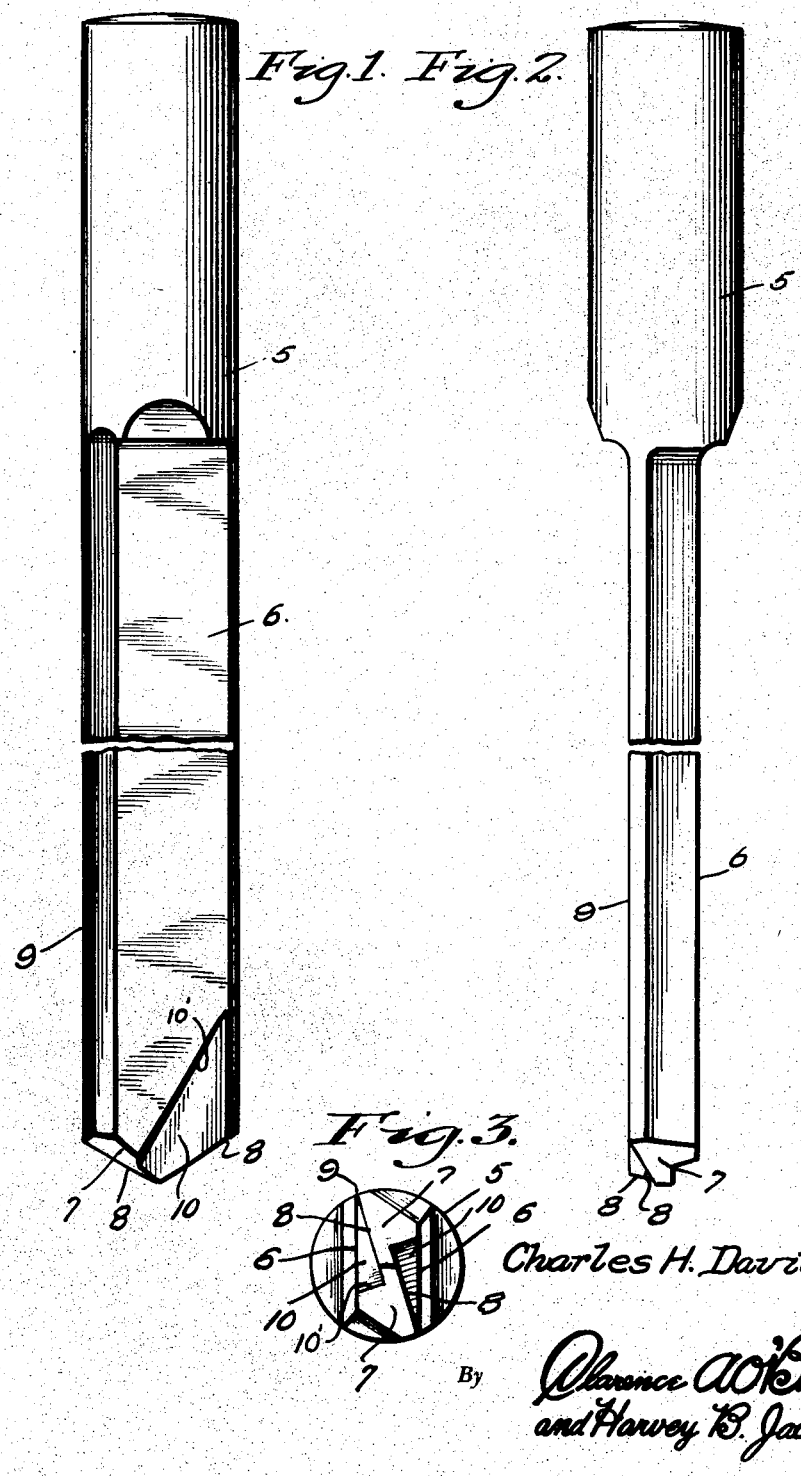
Inventor
Charles H. Davis
By Clarence A. O'Brien
and Harvey B. Jacobson
Attorneys Patented Aug. 1, 1944

2,354,985

UNITED STATES PATENT OFFICE 2,354,985

DRILL

Charles H. Davis, Alexandria, Va.

Application May 22, 1943, Serial No. 488,078

1 Claim. (Cl. 77—67)

This invention relates to new and useful improvements in drills, and especially metal drills.

Heretofore, the drills in general use have, to a substantial degree, been inefficient, due principally to the fact that it is difficult to sharpen the same unless in the hands of a highly skilled mechanic.

The principal object of the present invention is to provide a drill which can be easily sharpened and which, in use, will be more efficient than present-day drills, in that the cutting edges thereof will be so related as to uniformly cut the work without variance.

Still another important object of the invention is to provide a drill which will bite into the work in a more uniform fashion and cause an extrusion of the cuttings in a manner which will in no way affect the operation of the drill.

Other objects and advantages of the invention will become apparent to the reader of the following description:

In the drawing,

Figure 1 is a side elevational view of the improved drill.

Figure 2 is an edge elevational view of the drill.

Figure 3 is an end elevational view looking at the cutting end of the drill.

Referring to the drawing wherein like numerals designate like parts, it can be seen that the numeral 5 denotes a drill rod or shaft which has its work end definitely defined by its being reduced on diametrically opposite sides to a substantial amount to define parallel elongated flat surfaces 6 which extend to the work entering end of the drill shaft 5. The latter end of the drill shaft 5 is cut off on a V and bevelled as at 7, 7 to define cutting edges 8, 8. As may be seen in Figure 3, and also in Figure 1, the flat portions of the shaft, that is, the portions 6, 6, are bevelled to a cutting edge 9 along opposite longitudinal edges thereof, so that when the shaft 5 rotates, each edge will perform a substantial smoothing operation within the bore, and it is here to be noted that the free ends of these cutting edges 9 merge with the outer extremities of the edges 8. This can be readily seen in Figure 3.

It can further be seen that the surfaces 6 at the beveled end of the drill are provided with rabbets as at 10. These rabbets 10 extend at an inclination from the edges 9 to beveled end portions 7 and for more than one-half the distance across the flat surfaces 6 of the shaft, one accommodating cuttings from one edge 8 and the other accommodating cuttings from the other edge 8. In other words, any tendency of the cuttings to curl around the cutting end of the shaft will be stopped by the tendency of the channeled out portions 10 to provide an upward guidance to the cuttings, thereby preventing any tendency of the cuttings to wrap around the shaft, but to travel straight up the smooth side portions 6. It will also be noted that rabbets 10 gradually increase in depth toward the inclined walls 10' thereof.

While the foregoing specification sets forth the invention in specific terms, it is to be understood that numerous changes in the shape, size and materials may be resorted to without departing from the spirit of the invention as claimed hereinafter.

Having described the invention what is claimed as new is:

A drill comprising a cylindrical rod having a cutting end portion reduced on opposite sides to define parallel elongated flat longitudinal surfaces which extend to the work entering end of the drill and have corresponding beveled longitudinal cutting edges, said work entering end of the drill being beveled to V-form to define end cutting edges along corresponding sides of the beveled end portions, said flat longitudinal surfaces being provided at the beveled end of the drill with rabbets extending at an inclination from the longitudinal cutting edges part way across the flat longitudinal surfaces to the beveled end portions, said rabbets gradually increasing in depth toward the inclined walls thereof, and arranged to accommodate the cuttings from the end cutting edges.

CHARLES H. DAVIS.